(12) United States Patent
Fukuchi

(10) Patent No.: US 10,319,972 B2
(45) Date of Patent: Jun. 11, 2019

(54) SEPARATOR FOR RECHARGEABLE BATTERY AND RECHARGEABLE BATTERY INCLUDING THE SAME

(71) Applicant: SAMSUNG SDI CO., LTD., Yongin-si, Gyeonggi-do (KR)

(72) Inventor: Iwao Fukuchi, Yokohama (JP)

(73) Assignee: Samsung SDI Co., Ltd., Yongin-si (KR)

( * ) Notice: Subject to any disclaimer, the term of this patent is extended or adjusted under 35 U.S.C. 154(b) by 411 days.

(21) Appl. No.: 14/945,345

(22) Filed: Nov. 18, 2015

(65) Prior Publication Data

US 2016/0149190 A1    May 26, 2016

(30) Foreign Application Priority Data

Nov. 21, 2014   (JP) .................................. 2014-236968
Nov. 12, 2015   (KR) ........................ 10-2015-0159090

(51) Int. Cl.
*H01M 2/16*      (2006.01)
*H01M 10/0525*   (2010.01)

(52) U.S. Cl.
CPC ....... *H01M 2/1686* (2013.01); *H01M 2/1646* (2013.01); *H01M 2/1653* (2013.01); *H01M 10/0525* (2013.01); *H01M 2220/30* (2013.01)

(58) Field of Classification Search
CPC .......................... H01M 2/1646; H01M 2/1686
USPC ........................................................ 429/144
See application file for complete search history.

(56) References Cited

U.S. PATENT DOCUMENTS

2009/0246613 A1    10/2009  Park et al.
2012/0189898 A1*    7/2012  Wakizaka ............. H01M 2/145
                                                              429/144
2015/0111087 A1     4/2015  Choi et al.

FOREIGN PATENT DOCUMENTS

JP   2010-520095 A     6/2010
JP   2014-116186 A     6/2014
KR   10-2014-0147742 A    12/2014
KR   10-2015-0043703 A     4/2015
KR   10-2015-0045328 A     4/2015

OTHER PUBLICATIONS

English machine translation of Japanese Publication No. JP 2014-116186 A, dated Jun. 26, 2014, 10 pages.

* cited by examiner

*Primary Examiner* — James M Erwin
(74) *Attorney, Agent, or Firm* — Lewis Roca Rothgerber Christie LLP

(57) ABSTRACT

A separator for a rechargeable battery includes a substrate and a coating layer on at least one surface of the substrate, wherein the coating layer includes a binder including an acrylic resin, the binder including the acrylic resin includes a carboxyl group-containing acrylic monomer and an acrylic acid derivative monomer, and the carboxyl group-containing acrylic monomer and the acrylic acid derivative monomer are present in a mole ratio of about 20:80 to about 80:20. The binder for a rechargeable battery has high heat resistance and strong adherence, and improves the cycling characteristics of the battery.

14 Claims, 2 Drawing Sheets

SEPARATOR FOR RECHARGEABLE BATTERY AND RECHARGEABLE BATTERY INCLUDING THE SAME

CROSS-REFERENCE TO RELATED APPLICATIONS

This application claims priority to and the benefit of Japanese Patent Application No. 2014-236968 filed in the Japan Patent Office on Nov. 21, 2014, and Korean Patent Application No. 10-2015-0159090 filed in the Korean Intellectual Property Office on Nov. 12, 2015, the entire content of each of which is incorporated herein by reference.

BACKGROUND

1. Field

One or more aspects of embodiments of the present disclosure relates to a separator for a rechargeable battery and a rechargeable battery including the same.

2. Description of the Related Art

As electronic devices continue to decrease in weight and size, the rechargeable batteries that serve as power sources for these electronic devices are also required to have high capacities, lower weights, smaller sizes (e.g., form factors), and/or the like. Rechargeable lithium ion batteries have beneficial features such as high voltage, long cycle-life, high energy densities, and/or the like. Therefore, rechargeable lithium ion batteries are an area of active research, manufacturing, and sales.

The characteristics of a rechargeable lithium battery may be largely affected by the characteristics of its electrodes, electrolyte solution, other battery materials, and/or the like. For example, the separator for the rechargeable lithium ion battery may have an influence on the cycling characteristics of the rechargeable lithium ion battery.

The separator may be manufactured by coating a slurry including inorganic particles and a binder on a porous substrate.

Such a separator may be called a coating separator due to the presence of the coating layer including inorganic particles and binder on the porous substrate. The binder may facilitate bonding between the inorganic particles and a porous polyethylene film and/or facilitate bonding between the inorganic particles and other inorganic particles. When this separator is used to manufacture a rechargeable lithium ion battery, the cycling characteristics of the rechargeable lithium ion battery may be affected by the characteristics of the binder used to bond porous polyethylene (PE) with ceramic particles (e.g., the inorganic particles) as well as the ceramic particles themselves.

In some embodiments, when ceramic particles having high heat resistance are used to form the coating layer, a battery having high voltage and high-capacity characteristics may be manufactured. The ceramic particles having high heat-resistance may be able to sufficiently exert their characteristics when the binder stably maintains the structure of the ceramic coating layer during charge and discharge of the rechargeable lithium ion battery. In other words, the highly heat-resistant ceramic particles need to be stably maintained inside the separator. In addition, the binder needs to firmly bond the separator with each electrode. Accordingly, a binder having excellent heat resistance and adherence is required.

Currently, research on binders for coating separator is sparse, but binders used in electrodes have been used as binders for the coating separator. For example, a representative electrode binder composition (hereinafter referred to as a PVDF-based binder) obtained by mixing a polyvinylidene fluoride (PVDF)-based polymer with an organic solvent such as N-methyl-2-pyrrolidone (NMP) and/or the like may be used as the binder for a coating separator. However, the PVDF-based binder needs to be used in an excessive amount for the separator to maintain sufficient adherence, and the resulting structure of the coating layer is unstable due to impregnation of the electrolyte solution and mass transfer of lithium ions during charge and discharge of a rechargeable lithium ion battery.

In order to solve this problem, a method of improving adherence between an inorganic oxide (a kind of inorganic particle) and porous polyethylene (PE) using a binder having a strong adherence chemical structure, and a silane coupling agent has been suggested. Another method using an IPN (interpenetrating polymer network)-type or kind of resin obtained by polymerizing a PVDF-based polymer and a hydrophilic polymer (unsaturated carboxylic acid) and/or the like has also been suggested.

A separator having a porous coating layer formed as a mixture of inorganic particles (e.g., $BaTiO_3$ or $Al_2O_3$) and a binder polymer (e.g., butyl acrylate or a copolymer of acrylonitrile and acrylic acid) on a surface of a porous substrate and a rechargeable lithium battery using the separator have been previously disclosed.

However, the aforementioned binder exhibits adherence to either one of the porous PE or the inorganic particles, but has no sufficient (e.g., no substantial) adherence to both of them.

Accordingly, a coating separator formed of this binder undergoes structural changes during extended charge/discharge cycling of the rechargeable lithium ion battery, which shows deteriorating battery capacity.

The information disclosed in this Background section is included only to enhance understanding of the background of the present disclosure, and may therefore contain information that does not form the prior art that is already known in this country to a person of ordinary skill in the art.

SUMMARY

One or more aspects of embodiments of the present disclosure are directed toward a separator for a rechargeable battery using a binder having high heat resistance and strong adherence, as well as a rechargeable battery including the same, in which the separator is capable of improving the cell cycling characteristics of the rechargeable battery.

An embodiment of the present disclosure provides a separator for a rechargeable battery that includes a substrate and a coating layer on at least one surface of the substrate, wherein the coating layer may include a binder including an acrylic resin. The binder including the acrylic resin may include a carboxyl group-containing acrylic monomer and an acrylic acid derivative monomer, and the carboxyl group-containing acrylic monomer and the acrylic acid derivative monomer may be present in a mole ratio of about 20:80 to about 80:20.

The carboxyl group-containing acrylic monomer may be at least one selected from acrylic acid, metacrylic acid, maleic acid, mono methyl maleic acid, 2-carboxylethyl acrylate, and 2-carboxylethyl methacrylate.

The acrylic acid derivative monomer may be at least one selected from a nitrile group-containing acrylic monomer, an acrylic acid ester, and acrylamide.

The nitrile group-containing acrylic monomer may be at least one selected from acrylonitrile, metacrylonitrile, 2-cyanoethylacrylate, and 2-cyanoethylmetacrylate.

The carboxyl group-containing acrylic monomer may include an alkali metal salt or an ammonium salt.

The coating layer may further include a non-water-soluble resin.

The non-water-soluble resin may include polyvinylidene fluoride, a non-water-soluble acrylic resin, or a combination thereof.

The coating layer may further include polyvinyl alcohol.

The coating layer may further include inorganic particles.

The inorganic particles may include alumina, boehmite, or a combination thereof.

Another embodiment of the present disclosure provides a rechargeable battery including the separator for a rechargeable battery.

Other embodiments will be illustrated in the following detailed description.

The separator for a rechargeable battery according to one or more embodiments includes a coating layer binder including an acrylic resin, wherein the binder including the acrylic resin includes a carboxyl group-containing acrylic monomer and an acrylic acid derivative monomer, and the carboxyl group-containing acrylic monomer and the acrylic acid derivative monomer are present in a mole ratio of about 20:80 to about 80:20, and thus the binder has high heat resistance and strong adherence.

The above binder composition may improve the cycling characteristics of a rechargeable battery.

Accordingly, a rechargeable battery manufactured using the separator may have improved cycling characteristics.

BRIEF DESCRIPTION OF THE DRAWINGS

The accompanying drawings, together with the specification, illustrate embodiments of the present disclosure, and, together with the description, serve to explain principles of embodiments of the present disclosure.

DETAILED DESCRIPTION

Figure 1:
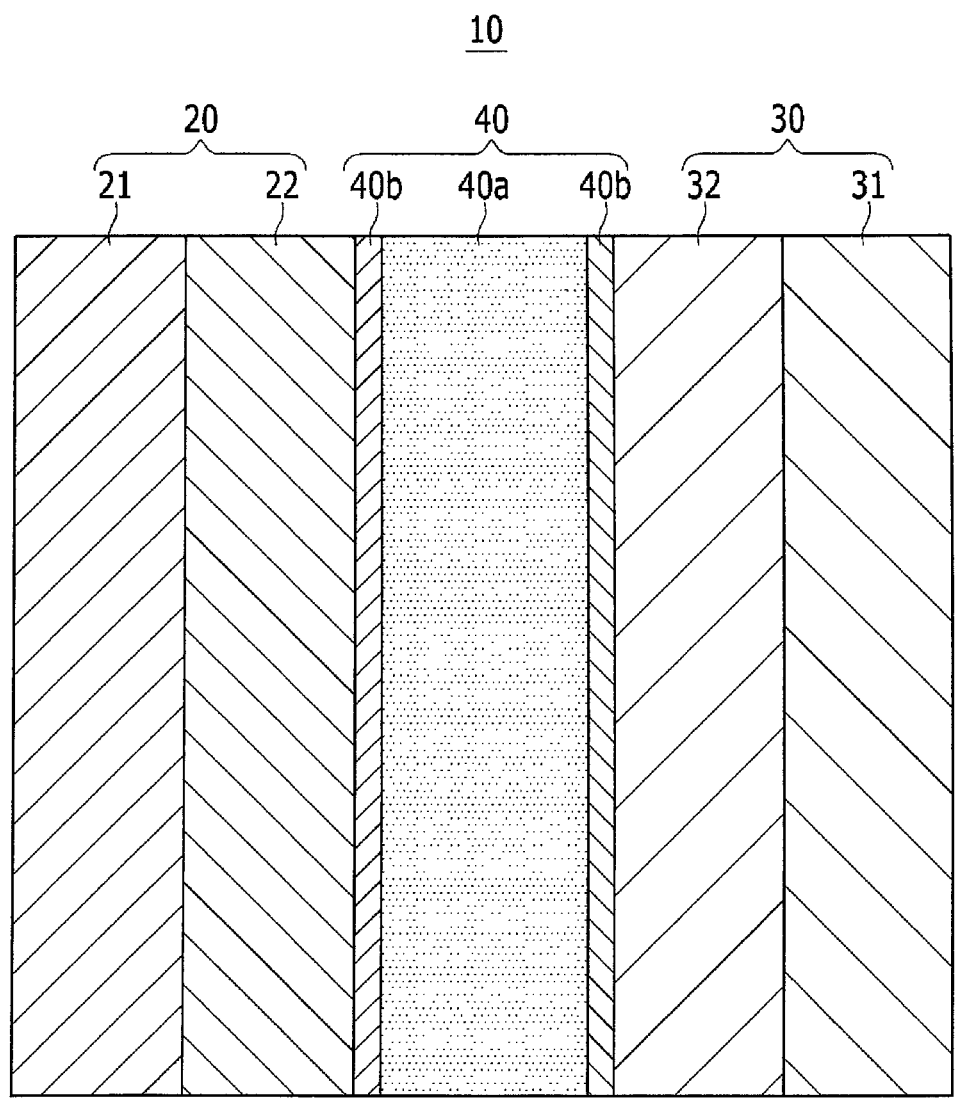
FIG. 1 is a cross sectional side view showing a rechargeable lithium ion battery according to one embodiment.

Hereinafter, embodiments of the present disclosure will be described in more detail with reference to the accompanying drawings, in which example embodiments of the disclosure are shown. As those skilled in the art would realize, the present disclosure is not limited thereto and the described embodiments may be modified in various different ways, all without departing from the spirit or scope of the present disclosure.

In the drawings, the thickness of layers, films, panels, regions, etc., may be exaggerated for clarity. Like reference numerals designate like elements throughout the specification. Constituent elements having substantially the same functional structure in the present specification and drawing are assigned by the same numeral and will not be repetitively illustrated. It will be understood that when an element such as a layer, film, region, or substrate is referred to as being "on" another element, it can be directly on the other element or intervening elements may also be present. In contrast, when an element is referred to as being "directly on" another element, no intervening elements are present.

Hereinafter, a separator for a rechargeable battery according to one or more embodiments is described.

A separator for a rechargeable battery according to one or more embodiments includes a coating layer on at least one surface of a substrate, in which the binder composition includes an acryl-based resin, including an carboxyl group-containing acrylic monomer and an acrylic acid derivative monomer (e.g., as major component or essential monomers). The heat resistance of the separator and the close contacting properties between the substrate and the coating layer may thus be improved.

The coating layer may be formed using the acryl-based resin as a binder, and the close contacting strength between the separator and the electrode layer may be improved.

For example, a rechargeable battery using the separator according to one embodiment may have improved safety and cycle life characteristics.

In one or more embodiments, a separator for a rechargeable battery includes a substrate and a coating layer on at least one surface of the substrate, wherein the coating layer includes a binder including an acrylic resin, the binder including the acrylic resin includes a carboxyl group-containing acrylic monomer and an acrylic acid derivative monomer, and the carboxyl group-containing acrylic monomer and the acrylic acid derivative monomer are present in a mole ratio of about 20:80 to about 80:20.

The separator for a rechargeable battery according to one embodiment may be manufactured using a binder having high heat resistance and strong adherence Accordingly, a rechargeable battery manufactured using the above described separator may have improved cycling characteristics.

The carboxyl group-containing monomer may be at least one selected from acrylic acid, metacrylic acid, maleic acid, mono methyl maleic acid, 2-carboxylethyl acrylate, and 2-carboxylethyl methacrylate.

The acrylic acid derivative monomer may be at least one selected from a nitrile group-containing acrylic monomer, an acrylic acid ester, and acrylamide.

The nitrile group-containing acrylic monomer may be at least one selected from acrylonitrile, metacrylonitrile, 2-cyanoethylacrylate and 2-cyanoethylmetacrylate.

The carboxyl group-containing acrylic monomer may include an alkali metal salt or an ammonium salt.

The coating layer may further include a non-water-soluble resin as another binder for a rechargeable battery.

The non-water-soluble resin may include polyvinylidene fluoride, a non-water-soluble acrylic resin, and/or a combination thereof. As used herein, the terms "combination", "combination thereof" and "combinations thereof" may refer to a chemical combination (e.g., an alloy or chemical compound), a mixture, or a laminated structure of components.

The coating layer may further include polyvinyl alcohol as another binder for a rechargeable battery.

The coating layer may further include inorganic particles. For example, a separator for a rechargeable battery according to one embodiment may further include inorganic particles. A rechargeable battery manufactured using the separator may exhibit further improved cycling characteristics.

The inorganic particles may include alumina, boehmite, or a combination thereof.

Another embodiment of the present disclosure is directed toward a rechargeable battery including the separator for a rechargeable battery.

The rechargeable battery may have improved cycling characteristics.

As described above, the separator for a rechargeable battery according to one embodiment may include the coating layer binder including an acrylic resin, in which the binder including the acrylic resin includes a carboxyl group-containing acrylic monomer and an acrylic acid derivative monomer, and the carboxyl group-containing acrylic monomer and the acrylic acid derivative monomer are present in a mole ratio of about 20:80 to about 80:20, and the binder has high heat resistance and strong adherence.

The binder composition may improve the cycling characteristics of a rechargeable battery.

Accordingly, a rechargeable battery using the separator may have improved cycling characteristics.

First Embodiment

Structure of Rechargeable Lithium Ion Battery

Referring to FIG. 1, a structure of a rechargeable lithium ion battery 10 according to a first embodiment will be described in more detail.

The rechargeable lithium ion battery 10 includes a positive electrode 20, a negative electrode 30, a separator 40, and a non-aqueous electrolyte.

The rechargeable lithium battery 10 may have a charge-reaching voltage (e.g., a maximum charge voltage, an oxidation-reduction potential) of, for example, greater than or equal to about 4.3 V (vs. Li$^+$/Li) and less than or equal to about 5.0 V, and in some embodiments, greater than or equal to about 4.5 V and less than or equal to about 5.0 V.

The rechargeable lithium ion battery 10 is not particularly limited in shape.

For example, the rechargeable lithium ion battery 10 may have any suitable shape such as a cylinder, a prism, a laminate type (e.g., a laminate battery shape), a button type (e.g., a coin cell or button battery shape), and/or the like.

Positive Electrode 20

The positive electrode 20 includes a current collector 21 and a positive active material layer 22.

The current collector 21 may be formed of any suitable conductive material, for example, aluminum (Al), stainless steel, nickel-plated steel, but embodiments of the present disclosure are not limited thereto.

The positive active material layer 22 includes a positive active material, and may further include a conductive material and a binder.

The positive active material may be, for example, a lithium-containing solid solution oxide, and may be any suitable material that can electrochemically intercalate and deintercalate lithium ions, without limitation.

Non-limiting examples of the solid solution oxide may include $Li_aMn_xCo_yNi_zO_2$ (1.150≤a≤1.430, 0.45≤x≤0.6, 0.10≤y≤0.15, 0.20≤z≤0.28), $LiMn_xCo_yNi_zO_2$ (0.3≤x≤0.85, 0.10≤y≤0.3, 0.10≤z≤0.3), and $LiMn_{1.5}Ni_{0.5}O_4$.

Non-limiting examples of the conductive material to improve the conductivity of a positive electrode may include a carbon black such as ketjenblack, acetylene black, and the like, and natural graphite, artificial graphite, and the like.

Non-limiting examples of the binder to bind the positive active material and the conductive material on the current collector 21 may include polyvinylidene fluoride (PVDF), an ethylene-propylene-diene terpolymer, a styrene-butadiene rubber (SBR), an acrylonitrile butadiene rubber, a fluororubber, polyvinyl acetate (PVA), polymethyl methacrylate (PMMA), polyethylene, and cellulose nitrate.

The positive active material layer 22 may be manufactured according to the following example method.

First, the positive active material, the conductive material, and the binder are dry-mixed to prepare a positive active mass.

The positive active mass is dispersed in an appropriate or suitable organic solvent to form positive active mass slurry, and the positive active mass slurry is coated on a current collector 21, dried, and compressed to form a positive active material layer.

Negative Electrode 30

The negative electrode 30 includes a current collector 31 and a negative active material layer 32.

The current collector 31 may be formed of any suitable conductor, and may be composed of, for example, aluminum, stainless steel, nickel plated steel, and/or the like, but embodiments of the present disclosure are not limited thereto.

The negative active material layer 32 may be any suitable negative active material layer of a rechargeable lithium battery.

For example, the negative active material layer 32 may include a negative active material, and may further include a binder.

Non-limiting examples of the negative active material may include graphite active material (e.g., artificial graphite, natural graphite, a mixture of artificial graphite and natural graphite, and natural graphite coating artificial graphite), particulates of silicon, tin or oxides thereof, or mixtures of the graphite active material therewith, alloys including silicon or tin as a main material, and titanium oxides such as $Li_4Ti_5O_{12}$.

The oxide of silicon may be an oxide represented by $SiO_x$ (0≤x≤2).

The negative active material may be, for example, metal lithium and/or the like.

The binder of the negative active material layer 32 may be the same as the binder of the positive active material layer 22.

The mass ratio of the negative active material and the binder is not particularly limited, and may be any suitable mass ratio for a rechargeable lithium ion battery.

The negative material layer 32 may be manufactured according to the following example method.

First, a negative active material and a binder are dry-mixed to prepare a negative active mass.

The negative active mass is dispersed in an appropriate or suitable solvent to prepare a negative active mass slurry, and the negative active mass slurry is coated on a current collector 31, dried, and compressed to form a negative active material layer 32.

Separator 40

The separator 40 includes a substrate 40a and a coating layer (filler layer) 40b.

The substrate 40a is not particularly limited, and may be any suitable separator in a rechargeable lithium ion battery.

The substrate 40a may include a porous layer and/or a non-woven fabric having excellent high-rate discharge performance. The materials may be used singularly or in a mixture thereof.

The substrate 40a may include a resin, for example, a polyolefin-based resin such as polyethylene or polypropylene, a polyester-based resin such as polyethylene terephthalate or polybutylene terephthalate, polyvinylidene fluoride, a vinylidene fluoride (VDF)-hexafluoropropylene (HFP) copolymer, a vinylidene fluoride-perfluorovinylether copolymer, a vinylidene fluoride-tetrafluoroethylene copolymer, a vinylidene fluoride-trifluoroethylene copolymer, a vinylidene fluoride-fluoroethylene copolymer, a vinylidene fluoride-hexafluoroacetone copolymer, a vinylidene fluoride-ethylene copolymer, a vinylidenefluoride-propylene copolymer, a vinylidene fluoride-trifluoropropylene copolymer, a vinylidene fluoride-tetrafluoroethylene-hexafluoropropylene copolymer, a vinylidene fluoride-ethylene-tetrafluoroethylene copolymer, and/or the like, but embodiments of the present disclosure are not limited thereto.

The coating layer 40b may include inorganic particles and a binder.

The inorganic particles according to the present embodiment may be, for example, inorganic particles having high heat resistance.

Non-limiting examples of these inorganic particles may include oxides and hydroxides of silicon (Si), aluminum (Al), magnesium (Mg), and titanium (Ti).

One or more embodiments may include inorganic particles of alumina, boehmite, or a combination thereof having high heat resistance and low moisture content.

When the separator 40 includes inorganic particles having such characteristics, the cycling characteristics of the rechargeable lithium ion battery 10 may be improved.

The inorganic particle diameter is not particularly limited.

The binder may play the role of maintaining (e.g., maintaining the positioning of) the inorganic particles inside the coating layer 40b (e.g., inside the separator 40).

The binder according to the present embodiment may include an acrylic resin including a carboxyl group-containing acrylic monomer and an acrylic acid derivative monomer(eas major component or essential monomers), and these essential monomers are polymerized in a mole ratio of about 20:80 to about 80:20. Hereinafter, this resin will be referred to as a "copolymerization acrylic resin".

The copolymerization acrylic resin according to the present embodiment may be used as a binder for the coating layer 40b, and the heat resistance of the separator 40 and the close contacting properties between the substrate 40a and the coating layer 40b may be improved.

In the present embodiment, the coating layer 40b may be formed using the copolymerization acrylic resin as a binder, and thereby the close contacting strength between the separator 40 and the electrodes (positive electrode 20 and negative electrode 30) may be improved.

Thereby, the safety and cycle life of the rechargeable lithium ion battery 10 may be improved.

In order to improve the heat resistance of the separator 40 and the close contacting properties between the substrate 40a and the coating layer 40b, as well as between the separator 40 and the electrodes (e.g., positive electrode 20 and negative electrode 30), the mole ratio of the carboxyl group-containing monomer and the acrylic acid derivative monomer may be about 30:70 to about 70:30, and in some embodiments, about 40:60 to about 60:40, and in some embodiments, about 40:60 to about 50:50.

The copolymerization acrylic resin as a main component of the binder of the coating layer 40b in the present embodiment may be any suitable block copolymer, random copolymer, or graft copolymer.

In order to improve the heat resistance of the separator 40 and the close contacting properties between the substrate 40a and the coating layer 40b, or between the separator 40 and the electrodes (e.g., positive electrode 20 and negative electrode 30), the copolymerization acrylic resin may be a graft copolymer, in which a side chain of a polymer obtained from polymerization of a nitrile group-containing acrylic monomer is grafted on a main chain of a polymer obtained from polymerization of a carboxyl group-containing acrylic monomer.

In this case, the moisture content of the separator 40 may be further reduced.

Non-limiting examples of the carboxyl group-containing acrylic monomer of the present embodiment may include acrylic acid, metacrylic acid, maleic acid, mono methyl maleic acid, 2-carboxylethyl acrylate, 2-carboxylethyl methacrylate, and the like.

These monomers may be used singularly or in a combination of two or more.

The acrylic acid derivative monomer of the present embodiment may be selected from a nitrile group-containing acrylic monomer, acrylic acid ester, acrylamide, and the like.

These monomers may be used singularly or in a combination of two or more.

Non-limiting examples of the nitrile group-containing acrylic monomer may include acrylonitrile, metacrylonitrile, 2-cyanoethylacrylate, 2-cyanoethylmetacrylate, and/or the like.

These monomers may be used singularly or in a combination of two or more.

Non-limiting examples of the acrylic acid ester may include isobornyl acrylate, 2,2,2-trifluoroethylacrylate, methyl (meth)acrylate, butyl (meth)acrylate, ethyl (meth) acrylate, 2-ethylhexyl(meth)acrylic acid, hydroxyethyl acrylate, 1H,1H-pentafluoropropyl acrylate, 2,2,3,3-tetrafluoropropyl acrylate, and the like.

These monomers may be used singularly or in a combination of two or more.

When the copolymerization acrylic resin according to the present disclosure has a higher glass transition temperature ($T_g$), the binder may have higher (e.g., improved) heat resistance.

Accordingly, at least one of the carboxyl group-containing acrylic monomer or the nitrile group-containing acrylic monomer may have a glass transition temperature ($T_g$) of greater than or equal to about 0° C. and in some embodiments, a glass transition temperature ($T_g$) greater than or equal to room temperature (e.g., about 25° C.).

The copolymer may have a high glass transition temperature.

When the copolymerization acrylic resin according to the present embodiment is a salt, its glass transition temperature ($T_g$) may be higher, and the binder may have higher (e.g., improved) heat resistance.

Accordingly, instead of including a monomer with an increased glass transition temperature ($T_g$) in the copolymerization acrylic resin, the carboxyl group-containing acrylic monomer may partially include an alkali metal salt or an ammonium salt of carbonic acid.

A carboxyl group-containing acrylic monomer may partially include an ammonium salt of carbonic acid in order to further reduce the amount of moisture included in the separator 40.

Herein, the separator 40 in the present embodiment may additionally include a non-water-soluble resin as a binder other than the copolymerization acrylic resin used as a main component.

The non-water-soluble resin may include polyvinylidene fluoride (PVDF), a non-water-soluble acrylic resin, and/or the like.

These non-water-soluble resins may be used singularly or in a combination of two or more.

The non-water-soluble acrylic resin may be a resin having a molecular weight of greater than or equal to about 50,000 g/mol, and may be, for example, a polyalkyl(meth)acrylate compound such as polymethyl (meth)acrylate, polybutyl (meth)acrylate, polyethyl (meth)acrylate, poly2-ethylhexyl (meth)acrylic acid, and/or the like.

Polyvinyl alcohol (PVA) and poly(vinyl acrylamide) (PNVA) may be included as binders in the present embodiment in addition to the copolymerization acrylic resin.

The PVA and/or the PNVA may be used instead of the non-water-soluble resin or in combination with the non-water-soluble resin.

The heat resistance, close contacting properties, and air permeability of the binder may be further improved by including the aforementioned non-water-soluble resin or the PVA as a binder.

Accordingly, the separator 40 manufactured using this binder may be used to further improve the safety or cycling characteristics of the rechargeable lithium ion battery 10.

The separator 40 may be manufactured according to the following example method:

First, an inorganic particle dispersion and a binder solution are prepared.

The inorganic particle dispersion is not particularly limited, and may include any suitable solvent if inorganic particles are dispersed therein.

The solvent of the inorganic particle dispersion may be the same solvent as that used for the binder solution.

The solvent of the binder solution may include any suitable solvent. Non-limiting examples of this solvent may include N-methyl pyrrolidone (NMP) and the like.

The inorganic particle dispersion and the binder solution may be mixed to prepare a slurry.

The concentration of the slurry may be adjusted by adding more of the solvent used for the binder solution.

A different type or kind of binder, for example, a PVDF-based binder (a binder including PVDF in its main chain) may be further added to the slurry.

The slurry may be applied (for example, coated) on the substrate 40a, and dried to prepare a coating layer 40b. The substrate 40a may be dipped in the slurry. According to the process, the separator 40 may be manufactured.

In FIG. 1, the coating layer 40b is only formed on the surface of the substrate 40a; however, the coating layer 40b may also be formed within the pores of the substrate 40a.

The non-aqueous electrolyte may be any suitable non-aqueous electrolyte for a rechargeable lithium battery, without limitation.

The non-aqueous electrolyte may have a composition including an electrolytic salt in a non-aqueous solvent.

Non-limiting examples of the non-aqueous solvent may include cyclic carbonates such as propylene carbonate, ethylene carbonate, butylene carbonate, chloroethylene carbonate, vinylene carbonate, and the like; cyclic esters such as γ-butyrolactone, γ-valerolactone, and the like; linear carbonates such as dimethyl carbonate, diethyl carbonate, ethylmethyl carbonate, and the like; linear esters such as methyl formate, methyl acetate, butyric acid methyl, and the like; tetrahydrofuran or derivatives thereof; ethers such as 1,3-dioxane, 1,4-dioxane, 1,2-dimethoxyethane, 1,4-dibutoxyethane, methyl diglyme, and the like; nitriles such as acetonitrile, benzonitrile, and the like; dioxolane or derivatives thereof; ethylene sulfide, sulfolane, sultone or derivatives thereof, which may be used singularly or as a mixture of two or more.

Non-limiting examples of the electrolytic salt may include an inorganic ion salt including lithium (Li), sodium (Na), or potassium (K), (such as $LiClO_4$, $LiBF_4$, $LiAsF_6$, $LiPF_6$, $LiPF_{6-x}(C_nF_{2n+1})_x$ ($1<x<6$, $n=1$ or $2$), LiSCN, LiBr, LiI, $Li_2SO_4$, $Li_2B_{10}Cl_{10}$, $NaClO_4$, NaI, NaSCN, NaBr, $KClO_4$, KSCN, and the like); and an organic ion salt (such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4NI$, $(C_2H_5)_4N$-maleate, $(C_2H_5)_4N$-benzoate, $(C_2H_5)_4N$-phthalate, lithium stearyl sulfonate, lithium octyl sulfonate, lithium dodecylbenzene sulfonate, and/or the like). The ionic compounds may be used singularly or as a mixture of two or more.

The concentration of the electrolytic salt may be the same (e.g., substantially the same) as that used in other rechargeable lithium batteries, and is not particularly limited.

In the present embodiment, an electrolyte solution including an appropriate or suitable lithium compound (electrolytic salt) at a concentration of about 0.8 mol/L to about 1.5 mol/L may be used.

The non-aqueous electrolyte may further include one or more suitable additives.

The additives may include a negative electrode-acting additive, a positive electrode-acting additive, an ester-based additive, a carbonate ester-based additive, a sulfuric acid ester-based additive, a phosphoric acid ester-based additive, a boric acid ester-based additive, an acid anhydride additive, and an electrolytic additive.

At least one compound selected from the above may be added to the non-aqueous electrolyte, and a plurality of additives may be added to the non-aqueous electrolyte.

Method of Manufacturing a Rechargeable Lithium Ion Battery

Hereinafter, a method of manufacturing a rechargeable lithium ion battery 10 will be described in more detail.

The positive electrode 20 may be manufactured according to the following example method.

First, a mixture of a positive active material, a conductive material, and a binder is dispersed in a solvent (for example, N-methyl-2-pyrrolidone) to prepare a slurry. Subsequently, the slurry is applied (for example, coated) on a current collector 21 and dried to form a positive active material layer 22.

The slurry application method is not particularly limited. Non-limiting examples of application methods may include a knife coater method and a gravure coater method.

The following application processes may be performed according to the same or similar methods. The positive active material layer 22 is compressed. In this way, the positive electrode 20 is manufactured.

The negative electrode 30 may be manufactured according to the same (e.g., substantially the same) method as that used for the positive electrode 20.

First, a mixture of a negative active material and a binder is dispersed in a solvent (for example, N-methyl-2-pyrrolidone or water) to prepare a slurry. Subsequently, the slurry is applied (for example, coated) on a current collector 31 and dried to form a negative active material layer 32. Then, the negative active material layer 32 is compressed. In this way, the negative electrode 30 is manufactured.

The separator 40 may be manufactured according to the following example method.

First, an inorganic particle dispersion and a binder solution are prepared. Then, the inorganic particle dispersion and the binder solution are mixed to prepare a slurry. The same solvent as that included in the binder solution may be added to the slurry to control the concentrations of the inorganic particle and binder. Subsequently, the slurry is applied (for example, coated) on the substrate 40a, and dried to prepare a coating layer 40b. The substrate 40a may be dipped in the slurry. In this way, the separator 40 is manufactured.

The separator 40 is subsequently positioned between the positive electrode 20 and the negative electrode 30 to prepare an electrode structure. The electrode structure is manufactured to have a desired or suitable shape (for example, a cylinder, a prism, a laminate, a button, and/or the like) and then inserted into a container having substantially the same shape. The electrolyte solution is injected into the container in order to impregnate the pores of the separator. In this way, a rechargeable lithium battery is manufactured.

Hereinafter, aspects of the present disclosure will be illustrated in more detail with reference to example embodiments. However, embodiments of the present disclosure are not limited thereto. Furthermore, some aspects of this disclosure that may be sufficiently understood by those of ordinary skill in the art will not be illustrated herein.

EXAMPLE

1. Synthesis of Binder

Various binder synthesis examples are described below.
The mixing amounts of sodium poly acrylate (PAANa) with other monomers are given as mole ratios (e.g., molar equivalents) unless specifically stated otherwise.

Synthesis Example 1: 50/50 Sodium Polyacrylate (PAANa)/Polyacrylonitrile (PAN)

363 g of distilled water and 62.4 g of a 20% sodium hydroxide aqueous solution (0.9 equivalents based on acrylic acid) were placed in a 500 mL 4-necked flask equipped with a stirrer, a thermometer, and a cooling tube, and the internal pressure of the flask was lowered to 10 mm Hg with a diaphragm pump and was resumed back to normal pressure with nitrogen. These internal pressure control processes were repeated three times.

Then, 25 g (0.347 mol) of acrylic acid, 25 g (0.471 mol) of acrylonitrile, and 0.29 g (0.00126 mol, 0.0015 equivalents) of ammonium persulfate were added to the 4-necked flask, and the mixture was stirred at 600 rpm.

The reaction solution was heated to a stable temperature between 65° C. to 70° C. and allowed to react for 4 hours, then heated up to 80° C. and allowed to react for 4 hours.

The reaction mixture was cooled down and adjusted to a pH between 7 to 8 by adding an appropriate or suitable amount of 20% sodium hydroxide aqueous solution.

When 2 mL of the reaction solution was taken therefrom to measure the non-volatile (NV) components, the result was 11.4% (compared to a theoretical value of 12%).

Synthesis Example 2: 40/60 Sodium Polyacrylate (PAANa)/Polyacrylonitrile (PAN)

A binder was synthesized according to substantially the same method as in Synthesis Example 1, except for using 456 g of distilled water, 52.7 g of a 20% sodium hydroxide aqueous solution (0.95 equivalents based on acrylic acid), 20 g (0.278 mol) of acrylic acid, 30 g (0.565 mol) of acrylonitrile, and 0.29 g (0.00126 mol, 0.0015 equivalents) of ammonium persulfate.

When the non-volatile (NV) component of the reaction solution was measured, the result was 9.3% (theoretical value: 10%).

Synthesis Example 3: 50/50 Sodium Polymetacrylate (PAANa)/Polyacrylonitrile (PAN)

A binder was synthesized according to substantially the same method as in Synthesis Example 1, except for using 362 g of distilled water, 55.2 g of a 20% sodium hydroxide aqueous solution (0.95 equivalents based on meta acrylic acid), 25 g (0.290 mol) of metacrylic acid, 25 g (0.471 mol) of acrylonitrile, and 0.348 g (0.00168 mol, 0.002 equivalents) of ammonium persulfate.

When the non-volatile (NV) component of the reaction was measured, the result was 12.0% (theoretical value: 12%).

Synthesis Example 4: 50/50 Sodium Polymetacrylate (PMAANa)/Polymetacrylonitrile (PMAN)

A binder was synthesized according to substantially the same method as in Synthesis Example 1, except for using 362 g of distilled water, 55.2 g of a 20% sodium hydroxide aqueous solution (0.95 equivalents based on metacrylic acid), 25 g (0.290 mol) of metacrylic acid, 25 g (0.373 mol) of metacrylonitrile, and 0.30 g (0.00133 mol, 0.002 equivalents) of ammonium persulfate.

When the non-volatile (NV) component of the reaction solution was measured, the result was 12.0% (theoretical value: 12%).

Synthesis Example 5: 50/50 Sodium Polyacrylate (PAANa)/Polyisobornyl Acrylate (PIsobor)

A binder was synthesized according to substantially the same method as in Synthesis Example 1, except for using 205 g of distilled water, 39.5 g of a 20% sodium hydroxide aqueous solution (0.95 equivalents based on acrylic acid), 15 g (0.208 mol) of acrylic acid, 15 g (0.072 mol) of isobornyl acrylate, and 0.096 g (0.00042 mol, 0.0015 equivalents) of ammonium persulfate.

When the non-volatile (NV) component of the reaction solution was measured, the result was 12.4% (theoretical value: 12.5%).

Synthesis Example 6: 50/50 Sodium Polyacrylate (PAANa)/Poly2,2,2-Trifluoroethylacrylate (PTrifluoroethyl)

A binder was synthesized according to substantially the same method as in Synthesis Example 1, except for using 205 g of distilled water, 39.5 g of a 20% sodium hydroxide aqueous solution (0.95 equivalents based on acrylic acid), 15 g (0.208 mol) of acrylic acid, 15 g (0.089 mol) of 2,2,2-trifluoroethylacrylate, and 0.102 g (0.00045 mol, 0.0015 equivalents) of ammonium persulfate.

When the non-volatile (NV) component of the reaction solution was measured, the result was 12.4% (theoretical value: 12.5%).

Synthesis Example 7: 30/70 Sodium Polyacrylate (PAANa)/Poly Acrylamide (PAAm)

A binder was synthesized according to substantially the same method as in Synthesis Example 1, except for using 235 g of distilled water, 11.9 g of a 20% sodium hydroxide aqueous solution (0.95 equivalents based on acrylic acid), 4.5 g (0.062 mol) of acrylic acid, 10.5 g (0.148 mol) of acrylamide, and 0.048 g (0.00021 mol, 0.001 equivalents) of ammonium persulfate.

When the non-volatile (NV) component of the reaction solution was measured, the result was 6.0% (theoretical value: 6.0%).

Synthesis Example 8: 50/50 Sodium Polyacrylate (PAANa)/Poly Acrylamide (PAAm)

A binder was synthesized according to substantially the same method as in Synthesis Example 1, except for using 235 g of distilled water, 19.8 g of a 20% sodium hydroxide aqueous solution (0.95 equivalents based on acrylic acid), 7.5 g (0.104 mol) of acrylic acid, 7.5 g (0.106 mol) of acrylamide, and 0.048 g (0.00021 mol, 0.001 equivalents) of ammonium persulfate.

When the non-volatile (NV) component of the reaction solution was measured, the result was 6.0% (theoretical value: 6.0%).

Synthesis Example 9: 70/30 Sodium Polyacrylate (PAANa)/Poly Acrylamide (PAAm)

A binder was synthesized according to substantially the same method as in Synthesis Example 1, except for using 235 g of distilled water, 27.7 g of a 20% sodium hydroxide aqueous solution (0.95 equivalents based on acrylic acid), 10.5 g (0.146 mol) of acrylic acid, 4.5 g (0.063 mol) of acrylamide, and 0.048 g (0.00021 mol, 0.001 equivalents) of ammonium persulfate.

When the non-volatile (NV) component of the reaction solution was measured, the result was 6.0% (theoretical value: 6.0%).

Synthesis Example 10: 62.5/37.5 Sodium Polyacrylate (PAANa)/Polyadamantyl Acrylate (PADM)

89 g of distilled water, 0.92 g of polyvinyl alcohol (RS2217, Kuraray Co., Ltd.) as a dispersing agent, and 8.0 g of a 20% sodium hydroxide aqueous solution (0.9 equivalents based on acrylic acid) were placed in a 300 mL 4-necked flask equipped with a stirrer, a thermometer, and a cooling tube, and the internal atmosphere was replaced with nitrogen with three vacuum-refill cycles down to 10 mmHg with a diaphragm pump.

3.2 g (0.044 mol) of acrylic acid, 4.8 g (0.027 mol) of adamantyl acrylate, and 0.023 g (0.00011 mol, 0.0015 equivalents) of ammonium persulfate were added to the 4-necked flask, and the mixture was stirred at 600 rpm.

The reaction solution was heated to a stable temperature between 65° C. and 70° C. and allowed to react for 4 hours, then heated up to 80° C. and allowed to react again for 4 hours.

The reaction solution was cooled down to room temperature and adjusted to a pH between 7 to 8 by adding an appropriate or suitable amount of 25% ammonia aqueous solution.

When the non-volatile (NV) component of the reaction solution was measured by taking 2 mL from the reaction solution, the result was 6.0% (theoretical value: 6.0%).

Synthesis Example 11: 70/30 Sodium Polyacrylate (PAANa)/Polyadamantyl Acrylate (PADM)

A binder was synthesized according to substantially the same method as in Synthesis Example 10, except for using 93 g of distilled water, 9.7 g of a 20% sodium hydroxide aqueous solution (0.9 equivalents based on acrylic acid), 3.89 g (0.054 mol) of acrylic acid, 4.34 g (0.024 mol) of adamantyl acrylate, and 0.027 g (0.00012 mol, 0.0015 equivalents) of ammonium persulfate.

When the non-volatile (NV) component of the reaction solution was measured, the result was 8.9% (theoretical value: 10%).

Synthesis Example 12: 80/20 Sodium Polyacrylate (PAANa)/Polyadamantyl Acrylate (PADM)

A binder was synthesized according to substantially the same method as in Synthesis Example 10, except for using 86 g of distilled water, 11.2 g of a 20% sodium hydroxide aqueous solution (0.9 equivalents based on acrylic acid), 4.48 g (0.062 mol) of acrylic acid, 2.80 g (0.016 mol) of adamantyl acrylate, and 0.027 g (0.00012 mol, 0.0015 equivalents) of ammonium persulfate.

When the non-volatile (NV) component of the reaction solution was measured, the result was 8.9% (theoretical value: 10%).

Synthesis Example 13: 70/30 Sodium Polyacrylate (PAANa)/Poly t-Butyl Acrylate (P-t-BuA)

81 g of distilled water, 9.7 g of a 20% sodium hydroxide aqueous solution (0.9 equivalents based on acrylic acid), and 3.8 g (0.054 mol) of acrylic acid were placed in a 300 mL 4-necked flask equipped with a stirrer, a thermometer, and a cooling tube, and the internal atmosphere of the flask was replaced by nitrogen with three vacuum-refill cycles down to 10 mm Hg with a diaphragm pump.

3.08 g (0.024 mol) of t-butyl acrylate and 0.027 g (0.00012 mol, 0.0015 equivalents) of ammonium persulfate were added to the 4-necked flask, and the mixture was stirred at 600 rpm.

The reaction solution was heated to a stable temperature between 65° C. and 70° C. and allowed to react for 4 hours, then heated up to 80° C. and allowed to react again for 4 hours.

The reaction solution was cooled down to room temperature and adjusted to have a pH between 7 to 8 by adding an appropriate or suitable amount of 25% ammonia aqueous solution.

When the non-volatile (NV) component of the reaction solution was measured by taking 2 mL of the reaction solution, the result was 9.0% (theoretical value: 10.0%).

Synthesis Example 14: 80/20 Sodium Polyacrylate (PAANa)/Poly t-Butyl Acrylate (P-t-BuA)

A binder was synthesized according to substantially the same method as in Synthesis Example 13, except for using 79 g of distilled water, 11.2 g of a 20% sodium hydroxide aqueous solution (0.9 equivalents based on acrylic acid), 4.48 g (0.062 mol) of acrylate, 2.05 g (0.016 mol) of t-butyl acrylate, and 0.027 g (0.00012 mol, 0.0015 equivalents) of ammonium persulfate.

When the non-volatile (NV) component of the reaction solution was measured, the result was 9.0% (theoretical value: 10.0%).

Synthesis Example 15: 20/60/20 Sodium Polyacrylate (PAANa)/Polyacrylonitrile (PAN)/Poly-2-Methyl Propane Sulfonic Acid Sodium (PAMPS)

A binder was synthesized according to substantially the same method as in Synthesis Example 13, except for using 145 g of distilled water, 9.0 g of a 20% sodium hydroxide aqueous solution (0.8 equivalents based on the total amount of acrylic acid and 2-methyl propane sulfonic acid), 3.0 g (0.042 mol) of acrylate, 0.077 g (0.00034 mol, 0.0015 equivalents) of ammonium persulfate, 9.0 g (0.170 mol) of acrylonitrile instead of t-butyl acrylate, and 3.0 g (0.014 mol) of 2-methyl propane sulfonic acid.

When the non-volatile (NV) component of the reaction solution was measured, the result was 9.0% (theoretical value: 10.0%).

Synthesis Example 16: 30/60/10 Sodium Polyacrylate (PAANa)/Polyacrylonitrile (PAN)/Poly-2-Methyl Propane Sulfonic Acid Sodium (PAMPS)

A binder was synthesized according to substantially the same method as in Synthesis Example 15, except for using 147 g of distilled water, 11.1 g of a 20% sodium hydroxide aqueous solution (0.8 equivalents based on acrylic acid), 4.5 g (0.062 mol) of acrylate, 9.0 g (0.170 mol) of acrylonitrile, 1.5 g (0.007 mol) of sodium 2-methyl propane sulfonic acid, and 0.082 g (0.00036 mol, 0.0015 equivalents) of ammonium persulfate.

When the non-volatile (NV) component of the reaction solution was measured, the result was 8.9% (theoretical value: 10.0%).

Synthesis Example 17: 35/60/5 Sodium Polyacrylate (PAANa)/Polyacrylonitrile (PAN)/Poly-2-Methyl Propane Sulfonic Acid Sodium (PAMPS)

A binder was synthesized according to substantially the same method as in Synthesis Example 15, except for using 148 g of distilled water, 12.2 g of a 20% sodium hydroxide aqueous solution (0.8 equivalents based on acrylic acid), 5.25 g (0.073 mol) of acrylate, 9.0 g (0.170 mol) of acrylonitrile, 0.75 g (0.004 mol) of sodium 2-methyl propane sulfonic acid, and 0.084 g (0.00037 mol, 0.0015 equivalents) of ammonium persulfate.

When the non-volatile (NV) component of the reaction solution was measured, the result was 9.0% (theoretical value: 10.0%).

Synthesis Example 18: 25/55/20 Sodium Polyacrylate (PAANa)/Polyacrylonitrile (PAN)/Poly-2-Methyl Propane Sulfonic Acid Sodium (PAMPS)

A binder was synthesized according to substantially the same method as in Synthesis Example 15, except for using 147 g of distilled water, 10.6 g of a 20% sodium hydroxide aqueous solution (0.8 equivalents based on acrylic acid), 3.75 g (0.052 mol) of acrylate, 8.25 g (0.155 mol) of acrylonitrile, 3.0 g (0.014 mol) of sodium 2-methyl propane sulfonic acid, and 0.076 g (0.00033 mol, 0.0015 equivalents) of ammonium persulfate.

When the non-volatile (NV) component of the reaction solution was measured, the result was 8.8% (theoretical value: 10.0%).

Synthesis Example 19: 35/55/10 Sodium Polyacrylate (PAANa)/Polyacrylonitrile (PAN)/Poly-2-Methyl Propane Sulfonic Acid Sodium (PAMPS)

A binder was synthesized according to substantially the same method as in Synthesis Example 15, except for using 149 g of distilled water, 12.8 g of a 20% sodium hydroxide aqueous solution (0.8 equivalents based on acrylic acid), 5.25 g (0.073 mol) of acrylate, 8.25 g (0.155 mol) of acrylonitrile, 1.5 g (0.007 mol) of sodium 2-methyl propane sulfonic acid, and 0.081 g (0.00035 mol, 0.0015 equivalents) of ammonium persulfate.

When the non-volatile (NV) component of the reaction solution was measured, the result was 9.0% (theoretical value: 10.0%).

Synthesis Example 20: 40/55/5 Sodium Polyacrylate (PAANa)/Polyacrylonitrile (PAN)//Poly-2-Methyl Propane Sulfonic Acid Sodium (PAMPS)

A binder was synthesized according to substantially the same method as in Synthesis Example 15, except for using 150 g of distilled water, 13.9 g of a 20% sodium hydroxide aqueous solution (0.8 equivalents based on acrylic acid), 6.0 g (0.083 mol) of acrylate, 8.25 g (0.155 mol) of acrylonitrile, 0.75 g (0.004 mol) of sodium 2-methyl propane sulfonic acid, and 0.083 g (0.00036 mol, 0.0015 equivalents) of ammonium persulfate.

When the non-volatile (NV) component of the reaction solution was measured, the result was 9.0% (theoretical value: 10.0%).

Synthesis Example 21: 38/57/5 Sodium Polyacrylate (PAANa)/Polyacrylonitrile (PAN)/Poly Maleic Acid 2 Sodium (PMalNa)

A binder was synthesized according to substantially the same method as in Synthesis Example 15, except for using 143 g of distilled water, 14.2 g of a 20% sodium hydroxide aqueous solution (0.8 equivalents based on the total moles of twice of acrylic acid and maleic acid), 5.40 g (0.075 mol) of acrylic acid, 8.10 g (0.153 mol) of acrylonitrile, 0.69 g (0.007 mol) of maleic acid, and 0.08 g (0.00035 mol, 0.0015 equivalents) of ammonium persulfate.

When the non-volatile (NV) component of the reaction solution was measured, the result was 8.8% (theoretical value: 10.0%).

Synthesis Example 22: 40/45/15 Sodium Polyacrylate (PAANa)/Polyacrylonitrile (PAN)/Polyacryloisobutyl POSS (P-i-BuPOSS)

A binder was synthesized according to substantially the same method as Synthesis Example 15 except for using 149 g of distilled water, 13.3 g of a 20% sodium hydroxide aqueous solution (0.8 equivalents based on acrylic acid), 6.00 g (0.083 mol) of acrylic acid, 6.75 g (0.127 mol) of acrylonitrile, 2.25 g (0.0024 mol) of polyacrylo isobutyl POSS, and 0.073 g (0.00032 mol, 0.0015 equivalents) of ammonium persulfate.

When the non-volatile (NV) component of the reaction solution was measured, the result was 9.0% (theoretical value: 10.0%).

Synthesis Example 23: 40/50/10 Sodium Polyacrylate (PAANa)/Polyacrylonitrile (PAN)/Polyacryloisobutyl POSS (P-i-BuPOSS)

A binder was synthesized according to substantially the same method as in Synthesis Example 15, except for using 149 g of distilled water, 13.3 g of a 20% sodium hydroxide aqueous solution (0.8 equivalents based on acrylic acid), 6.00 g (0.083 mol) of acrylic acid, 7.50 g (0.141 mol) of acrylonitrile, 1.50 g (0.0016 mol) of polyacrylo isobutyl POSS, and 0.077 g (0.00034 mol, 0.0015 equivalents) of ammonium persulfate.

When the non-volatile (NV) component of the reaction solution was measured, the result was 9.0% (theoretical value: 10.0%).

Synthesis Example 24: 40/55/5 Sodium Polyacrylate (PAANa)/Polyacrylonitrile (PAN)/Polyacryloisobutyl POSS (P-i-BuPOSS)

A binder was synthesized according to substantially the same method as in Synthesis Example 15, except for using 150 g of distilled water, 13.3 g of a 20% sodium hydroxide aqueous solution (0.8 equivalents based on acrylic acid), 6.00 g (0.083 mol) of acrylic acid, 8.25 g (0.155 mol) of acrylonitrile, 0.75 g (0.0008 mol) of polyacrylo isobutyl POSS, and 0.082 g (0.00036 mol, 0.0015 equivalents) of ammonium persulfate.

When the non-volatile (NV) component of the reaction solution was measured, the result was 8.9% (theoretical value: 10.0%).

Synthesis Example 25: 30/70 Sodium Polyacrylate (PAANa)/Polyacrylonitrile (PAN)

A binder was synthesized according to substantially the same method as in Synthesis Example 1, except for using 147 g of distilled water, 11.2 g of a 20% sodium hydroxide aqueous solution (0.9 equivalents based on acrylic acid), 4.5 g (0.062 mol) of acrylic acid, 10.5 g (0.198 mol) of acrylonitrile, and 0.089 g (0.00039 mol, 0.0015 equivalents) of ammonium persulfate.

The binder was not used to manufacture a separator, since a large amount of an agglomerated precipitate was produced as the reaction proceeded.

Synthesis Example 26: 80/20 Synthesis Example of Sodium Polyacrylate (PAANa)/Polyacrylonitrile (PAN)

A binder was synthesized according to substantially the same method as in Synthesis Example 1, except for using 167 g of distilled water, 30.0 g of a 20% sodium hydroxide aqueous solution (0.9 equivalents based on acrylic acid), 12.0 g (0.167 mol) of acrylic acid, 3.0 g (0.057 mol) of acrylonitrile, and 0.076 g (0.00033 mol, 0.0015 equivalents) of ammonium persulfate.

When the non-volatile (NV) component of the reaction solution was measured, the result was 9.0% (theoretical value: 10.0%).

Synthesis Example 27: 11/86/3 Sodium Polyacrylate (PAANa)/Polybutyl Acrylate (P-n-Bu)/Poly Glycidyl Methacrylate (PGryci)

A binder was synthesized according to substantially the same method as in Synthesis Example 15, except for using 181 g of distilled water, 5.2 g of a 20% sodium hydroxide aqueous solution (0.9 equivalents based on acrylic acid), 2.10 g (0.029 mol) of acrylic acid, 16.8 g (0.131 mol) of butyl acrylate, 0.6 g (0.004 mol) of glycidyl methacrylate, and 0.056 g (0.00036 mol, 0.0015 equivalents) of ammonium persulfate.

When the non-volatile (NV) component of the reaction solution was measured, the result was 8.9% (theoretical value: 10.0%).

2. Manufacture of Coating Separator

Comparative Example 1

164 g of distilled water and 68.3 g of a 10% sodium poly acrylate aqueous solution (Sigma-Aldrich Co.) as a binder (corresponding to 6.8 g of the NV (non-volatile) component, 10 wt % based on the total weight of the boehmite), were added to 61.4 g of boehmite C20 (Taimei Chemicals Co., Ltd.) and 6.8 g of boehmite ACTILOX-200SM (Nabaltec AG). The mixture was stirred until it became a slurry and was then dispersed with a bead mill (zirconia beads, 0.5 φ, charge rate of 60%, 2000 rpm, $4^{th}$ pass), preparing a boehmite/binder mixed solution.

The boehmite/binder mixed solution was coated and dried on a commercially-available 12 μm-thick microporous polyethylene film (T12-507, SK Innovation Co., Ltd.) using a gravure coater set (e.g., calibrated) to load 3.0 g/m² after drying, thus obtaining the coating separator of Comparative Example 1.

The coating separator was used to manufacture a battery cell by vacuum-drying it at 60° C. for 12 hours at 133 Pa, to remove the moisture therefrom.

Comparative Example 2

A coating separator according to Comparative Example 2 was obtained according to substantially the same method as in Comparative Example 1, except for using 175 g of distilled water and 27.2 g of a 25 wt % PVDF dispersion (Solef 90000, Solvay) (6.8 g NV component, 10 wt % based on the total weight of boehmite) as a binder.

Example 1

A coating separator according to Example 1 was obtained according to substantially the same method as in Comparative Example 1, except for using 171 g of distilled water, 59.9 g of the binder of Synthesis Example 1 (6.8 g NV component, 10 wt % based on the total weight of boehmite).

Example 2

A coating separator according to Example 2 was obtained according to substantially the same method as in Comparative Example 1, except for using 158 g of distilled water, 73.4 g of the binder of Synthesis Example 2 (6.8 g NV component, 10 wt % based on the total weight of boehmite).

Example 3

A coating separator according to Example 3 was obtained according to substantially the same method as in Comparative Example 1, except for using 175 g of distilled water, 73.4 g of the binder of Synthesis Example 3 (6.8 g NV component, 10 wt % based on the total weight of boehmite).

Example 4

A coating separator according to Example 4 was obtained according to substantially the same method as in Comparative Example 1, except for using 175 g of distilled water, 56.9 g of the binder of Synthesis Example 4 (6.8 g NV component, 10 wt % based on the total weight of boehmite).

Example 5

A coating separator according to Example 5 was obtained according to substantially the same method as in Comparative Example 1, except for using 177 g of distilled water, 55.0 g of the binder of Synthesis Example 5 (6.8 g NV component, 10 wt % based on the total weight of boehmite).

Example 6

A coating separator according to Example 6 was obtained according to substantially the same method as in Comparative Example 1, except for using 177 g of distilled water, 55.0 g of the binder of Synthesis Example 6 (6.8 g NV component, 10 wt % of the total weight of boehmite).

Example 7

A coating separator according to Example 7 was obtained according to substantially the same method as in Comparative Example 1, except for using 118 g of distilled water, 113.8 g of the binder of Synthesis Example 7 (6.8 g NV component, 10 wt % based on the total weight of boehmite).

Example 8

A coating separator according to Example 8 was obtained according to substantially the same method as in Comparative Example 1, except for using 118 g of distilled water, 113.8 g of the binder of Synthesis Example 8 (6.8 g NV component, 10 wt % based on the total weight of boehmite).

Example 9

A coating separator according to Example 9 was obtained according to substantially the same method as in Comparative Example 1, except for using 118 g of distilled water, 113.8 g of the binder of Synthesis Example 9 (6.8 g NV component, 10 wt % based on the total weight of boehmite).

Example 10

A coating separator according to Example 10 was obtained according to substantially the same method as in Comparative Example 1, except for using 188 g of distilled water, 29.9 g of the binder of Synthesis Example 1 (3.4 g NV component, 5 wt % of the total weight of boehmite), and 13.7 g of a 25 wt % PVDF aqueous dispersion (3.4 g NV component, 5 wt % based on the total weight of boehmite, Solef 90000 made by Solvay).

Example 11

A coating separator according to Example 11 was obtained according to substantially the same method as in Comparative Example 1, except for using 188 g of distilled water, 36.7 g of the binder of Synthesis Example 2 (3.4 g NV component, 5 wt % based on the total weight of boehmite), and 13.7 g of a 25 wt % PVDF aqueous dispersion (3.4 g NV component, 5 wt % of the total weight of boehmite, Solef 90000 made by Solvay).

Example 12

A coating separator according to Example 12 was obtained according to substantially the same method as in Comparative Example 1, except for using 182 g of distilled water, 29.9 g of the binder of Synthesis Example 1 (3.4 g NV component, 5 wt % based on the total weight of boehmite), and 20.2 g of a 16.9 wt % non-water-soluble acryl aqueous dispersion (3.4 g NV component, 5 wt % based on the total weight of boehmite, SSE2G made by Hitachi Chemical Company, Ltd).

Example 13

A coating separator according to Example 13 was obtained according to substantially the same method as in Comparative Example 1, except for using 174 g of distilled water, 36.7 g of the binder of Synthesis Example 1 (3.4 g NV component, 5 wt % based on the total weight of boehmite), and 20.2 g of a 16.9 wt % non-water-soluble acryl aqueous dispersion (3.4 g NV component, 5 based on the total weight of boehmite, SSE2G made by Hitachi Chemical Company, Ltd).

Example 14

A coating separator according to Example 14 was obtained according to substantially the same method as in Comparative Example 1, except for using 157 g of distilled water and 75.6 g of the binder of Synthesis Example 10 (6.8 g NV component, 10 wt % based on the total weight of boehmite).

Example 15

A coating separator according to Example 15 was obtained according to substantially the same method as in Comparative Example 1, except for using 156 g of distilled water and 76.4 g of the binder of Synthesis Example 11 (6.8 g NV component, 10 wt % of the total weight of boehmite).

Example 16

A coating separator according to Example 16 was obtained according to substantially the same method as in Comparative Example 1, except for using 156 g of distilled water and 76.4 g of the binder of Synthesis Example 12 (6.8 g NV component, 10 wt % based on the total weight of boehmite).

Example 17

A coating separator according to Example 17 was obtained according to substantially the same method as in Comparative Example 1, except for using 157 g of distilled water and 75.6 g of the binder of Synthesis Example 13 (6.8 g NV component, 10 wt % based on the total weight of boehmite).

Example 18

A coating separator according to Example 18 was obtained according to substantially the same method as in Comparative Example 1, except for using 157 g of distilled water and 75.6 g of the binder of Synthesis Example 14 (6.8 g NV component, 10 wt % based on the total weight of boehmite).

Example 19

A coating separator according to Example 19 was obtained according to substantially the same method as in Comparative Example 1, except for using 157 g of distilled water and 75.6 g of the binder of Synthesis Example 15 (6.8 g NV component, 10 wt % based on the total weight of boehmite).

Example 20

A coating separator according to Example 20 was obtained according to substantially the same method as in Comparative Example 1, except for using 156 g of distilled water and 76.4 g of the binder of Synthesis Example 16 (6.8 g NV component, 10 wt % based on the total weight of boehmite).

Example 21

A coating separator according to Example 21 was obtained according to substantially the same method as in Comparative Example 1, except for using 157 g of distilled water and 75.6 g of the binder of Synthesis Example 17 (6.8 g NV component, 10 wt % based on the total weight of boehmite).

Example 22

A coating separator according to Example 22 was obtained according to substantially the same method as in Comparative Example 1, except for using 155 g of distilled water and 77.3 g of the binder of Synthesis Example 18 (6.8 g NV component, 10 wt % based on the total weight of boehmite).

Example 23

A coating separator according to Example 23 was obtained according to substantially the same method as in Comparative Example 1, except for using 157 g of distilled water and 75.6 g of the binder of Synthesis Example 19 (6.8 g NV component, 10 wt % based on the total weight of boehmite).

Example 24

A coating separator according to Example 24 was obtained according to substantially the same method as in Comparative Example 1, except for using 157 g of distilled water and 75.6 g of the binder of Synthesis Example 20 (6.8 g NV component, 10 wt % based on the total weight of boehmite).

Example 25

A coating separator according to Example 25 was obtained according to substantially the same method as in Comparative Example 1, except for using 155 g of distilled water and 77.3 g of the binder of Synthesis Example 20 (6.8 g NV component, 10 wt % based on the total weight of boehmite).

Example 26

A coating separator according to Example 26 was obtained according to substantially the same method as in Comparative Example 1, except for using 157 g of distilled water and 75.6 g of the binder of Synthesis Example 21 (6.8 g NV component, 10 wt % based on the total weight of boehmite).

Example 27

A coating separator according to Example 27 was obtained according to substantially the same method as in Comparative Example 1, except for using 157 g of distilled water and 75.6 g of the binder of Synthesis Example 22 (6.8 g NV component, 10 wt % based on the total weight of boehmite).

Example 28

A coating separator according to Example 28 was obtained according to substantially the same method as in Comparative Example 1, except for using 156 g of distilled water and 76.4 g of the binder of Synthesis Example 20 (6.8 g NV component, 10 wt % based on the total weight of boehmite).

Comparative Example 3

A coating separator according to Comparative Example 3 was obtained according to substantially the same method as in Comparative Example 1, except for using 157 g of distilled water and 75.6 g of the binder of Synthesis Example 26 (6.8 g NV component, 10 wt % based on the total weight of boehmite).

Comparative Example 4

A coating separator according to Comparative Example 4 was obtained according to substantially the same method as in Comparative Example 1, except for using 159 g of distilled water and 73.1 g of the binder of Synthesis Example 27 (6.8 g NV component, 10 wt % based on the total weight of boehmite).

3. Close Contacting Property Evaluation of Coating Layer

A 1.5 cm-wide adhesive tape (Celotape No. 405, Nichiban Co., Ltd.) was attached to each coating separator fixed on a stainless steel plate.

Then, a peeling tester (SHIMAZU EZ-S, Shimadzu Co.) was used to measure the peel strength of the coating separator through a 180° peeling test.

The measured close contacting property evaluation results are provided in Table 1.

4. Evaluation of Thermal Shrinkage

Figure 2:
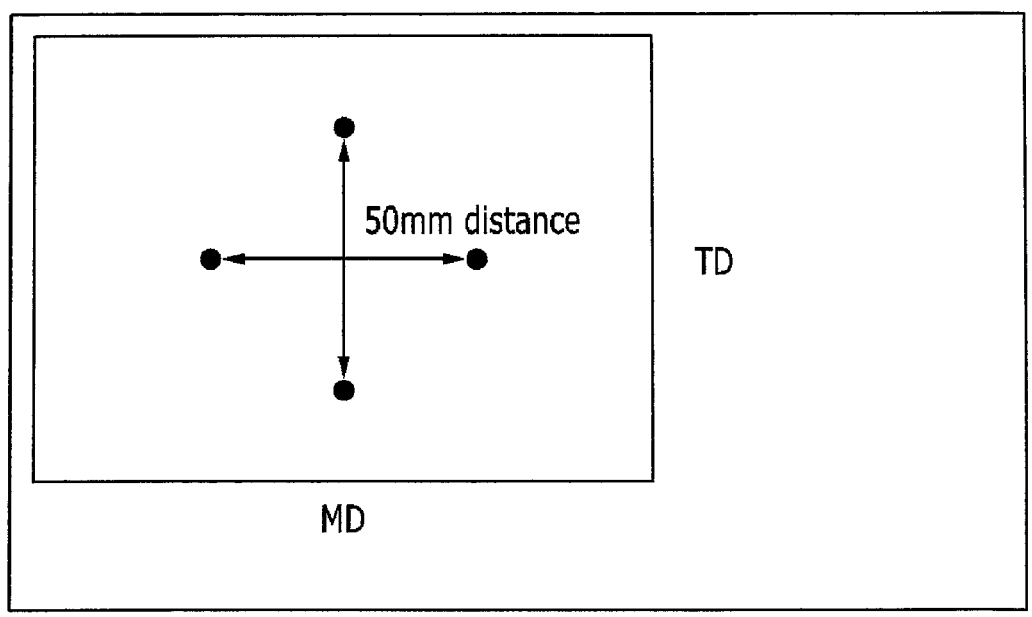
FIG. 2 is a schematic view illustrating the method of preparing samples for thermal shrinkage evaluation according to the Examples.

As shown in FIG. 2, the coating separator was cut into a size of TD*MD=60 mm*80 mm and marked every 50 mm in the TD and MD directions using a nonius (Vernier caliper).

The separator was inserted between the two layers of a piece of aluminum foil folded once and heated in a 130° C. thermostat for 60 minutes.

The separator was subsequently removed, the nonius (Vernier caliper) was used to read the marked TD/MD distance, and the thermal shrinkage ratio was calculated according to the following Equation 1.

The obtained thermal shrinkage evaluation results are provided in Table 1.

In Equation 1, the distance between points after heating refers to the distance along the TD direction.

Thermal shrinkage ratio (%)=((50−Distance after heating)/50)*100)     Equation 1

4-1. Evaluation of Air Permeability

Air permeability was evaluated by measuring the time taken for 100 cc of air to pass through the membrane, using a Gurley desometer made by Toyo Seikikogyo Co., Ltd. (internal cylinder weight (e.g., pressure): 567 g, hollow diameter of transmission section: 28.6 mm (6.45 cm$^2$)).

Shorter (e.g., smaller) air passage time values are associated with higher air permeability.

TABLE 1

| Binder | Coating Separator | Peeling Strength (mN/mm) | Shrinkage Ratio (%) | Air Permeability (sec/100 cc) |
|---|---|---|---|---|
| PAANa | Comparative Example 1 | 450 | 1.5 | 335 |
| PVDF | Comparative Example 2 | 5 | 3 | 105 |
| Synthesis Example 26 | Comparative Example 3 | 400 | 2 | 225 |
| Synthesis Example 27 | Comparative Example 4 | 110 | 22 | 254 |
| Synthesis Example 1 | Example 1 | 270 | 2 | 227 |
| Synthesis Example 2 | Example 2 | 353 | 2 | 225 |
| Synthesis Example 3 | Example 3 | 234 | 1.5 | 261 |
| Synthesis Example 4 | Example 4 | 318 | 2 | 251 |
| Synthesis Example 5 | Example 5 | 230 | 2 | 174 |
| Synthesis Example 6 | Example 6 | 201 | 1.5 | 223 |
| Synthesis Example 7 | Example 7 | 351 | 1.5 | 290 |
| Synthesis Example 8 | Example 8 | 514 | 2 | 318 |
| Synthesis Example 9 | Example 9 | 412 | 1.5 | 320 |
| Synthesis Example 1: Solef 90000 = 5:5 | Example 10 | 160 | 1.5 | 101 |
| Synthesis Example 2: Solef90000 = 5:5 | Example 11 | 120 | 1.5 | 105 |
| Synthesis Example 1: SSE2G = 5:5 | Example 12 | 167 | 1.5 | 101 |
| Synthesis Example 2: SSE2G = 5:5 | Example 13 | 123 | 1.5 | 103 |
| Synthesis Example 10 | Example 14 | 320 | 2 | 210 |
| Synthesis Example 11 | Example 15 | 310 | 1.5 | 215 |
| Synthesis Example 12 | Example 16 | 280 | 1.5 | 220 |
| Synthesis Example 13 | Example 17 | 230 | 2 | 210 |
| Synthesis Example 14 | Example 18 | 200 | 1.5 | 220 |
| Synthesis Example 15 | Example 19 | 194 | 1.5 | 213 |
| Synthesis Example 16 | Example 20 | 324 | 1.5 | 221 |
| Synthesis Example 17 | Example 21 | 462 | 1.5 | 222 |
| Synthesis Example 18 | Example 22 | 350 | 1.5 | 227 |
| Synthesis Example 19 | Example 23 | 447 | 1.5 | 225 |
| Synthesis Example 20 | Example 24 | 562 | 1.5 | 218 |
| Synthesis Example 21 | Example 25 | 350 | 1.5 | 264 |
| Synthesis Example 22 | Example 26 | 270 | 1.5 | 271 |
| Synthesis Example 23 | Example 27 | 382 | 1.5 | 280 |
| Synthesis Example 24 | Example 28 | 330 | 1.5 | 254 |

Referring to Table 1, the binders of Synthesis Examples 1 to 24, 26, and 27 and the binders obtained by adding the non-water-soluble resins of Synthesis Examples 1 and 2 showed excellent heat resistance and adherence.

The binders of Synthesis Examples 1 to 24, 26, and 27 and the binders obtained by adding the non-water-soluble resins of Synthesis Examples 1 and 2 also showed low air permeability.

5. Manufacture of Rechargeable Battery Cell

Example 29

Preparation of Negative Active Mass Slurry 96 wt % of artificial graphite, 2 wt % of acetylene black, 1 wt % of a styrene butadiene copolymer (SBR) binder, and 1 wt % of carboxylmethyl cellulose (CMC) were mixed, and water was added to adjust the viscosity of the mixture, thereby preparing a negative active mass slurry.

The negative active mass slurry included 48 wt % of non-volatile components based on the total weight of the slurry.

Manufacture of Negative Electrode

The negative active mass slurry was uniformly coated on a copper foil (a 10 μm-thick current collector) with a bar coater by adjusting the gap of the bar coater to coat the slurry in a coating amount (surface density) of 9.55 mg/cm$^2$ after drying.

Then, the coating was dried with a blowing drier set (e.g., calibrated) at 80° C. for 15 minutes.

The dried electrode was pressed to an active mass density of 1.65 g/cm$^3$ with a roll presser.

The resulting electrode was vacuum-dried at 150° C. for 6 hours, thereby manufacturing a sheet-type (e.g., sheet format) negative electrode including a negative current collector and a negative active material layer.

Preparation of Positive Electrode Material Mix Slurry 96 wt % of a solid solution oxide, $Li_{1.20}Mn_{0.55}Co_{0.10}Ni_{0.15}O_2$, 2 wt % of ketjenblack, and 2 wt % of polyvinylidene fluoride were dispersed into N-methyl-2-pyrrolidone, thereby preparing a positive active mass material slurry.

The positive active mass slurry included a non-volatile component of 50 wt % (based on the total weight of the positive active mass slurry).

Manufacture of Positive Electrode

The positive active mass slurry was uniformly coated on an aluminum foil current collector with a bar coater by adjusting the gap of the bar coater to coat the slurry in a coating amount (surface density) of 22.7 mg/cm$^2$ after drying.

The electrode was dried with a blowing drier set (e.g., calibrated) at 80° C. for 15 minutes.

The dried electrode was pressed to an active mass density of 3.9 g/cm$^3$ with a roll presser.

The resulting electrode was vacuum-dried at 80° C. for 6 hours, thereby manufacturing a sheet-type (e.g., sheet format) positive electrode including a positive electrode current collector and a positive active material layer.

Manufacture of Rechargeable Lithium Ion Battery Cell

The negative electrode was cut into a disk having a diameter of 1.55 cm, while the positive electrode was cut into a disk having a diameter of 1.3 cm.

The coating separator of Example 1 was cut into a disk having a diameter of 1.8 cm.

The positive electrode disk having a diameter of 1.3 cm, the coating separator disk of Example 1 having a diameter of 1.8 cm, the negative electrode disk having a diameter of 1.55 cm, and a 200 μm-thick copper foil disk spacer having a diameter of 1.5 cm were sequentially stacked into a stainless steel coin container having a diameter of 2.0 cm.

Then, 150 μL of an electrolyte solution (1.4 M $LiPF_6$ dissolved in a 10/70/20 ratio by volume of ethylene carbonate/diethylcarbonate/fluoroethylene carbonate) was inserted into the container.

The container was covered with a polypropylene packing material (e.g., sealing o-ring) and a stainless steel cap, and sealed with an assembler (e.g., coin cell press).

Through this process, a rechargeable lithium ion battery cell (e.g., a coin cell) according to Example 14 was manufactured.

Examples 30 to 56 and Comparative Examples 5 and 6

Rechargeable lithium ion battery cells according to Examples 30 to 56 and Comparative Examples 5 to 8 were manufactured using substantially the same method as in Example 29, except for respectively using the series of separators listed in Table 2.

6. Evaluation of Cycle-Life

The rechargeable lithium ion battery cells according to the Examples and Comparative Examples were charged and discharged once at 25° C. at a rate of 0.2 C.

Then, the rechargeable lithium ion battery cells were charged and discharged 100 times at a rate of 1.0 C.

A discharge capacity retention (as a percentage) was obtained by dividing the discharge capacity at the 100th cycle (the $100^{th}$ 1.0 C charge/discharge cycle) by the discharge capacity at the first cycle (the 1st 1.0 C charge/discharge cycle).

A larger percentage of capacity retention is correlated with a better (e.g., longer) cycle-life.

The capacity retention results are shown in Table 2.

TABLE 2

| Coin Cell | Separator | Capacity Retention After 100th Cycle |
|---|---|---|
| Example 29 | Example 1 | 87 |
| Example 30 | Example 2 | 89 |
| Example 31 | Example 3 | 88 |
| Example 32 | Example 4 | 90 |
| Example 33 | Example 5 | 89 |
| Example 34 | Example 6 | 90 |
| Example 35 | Example 7 | 91 |
| Example 36 | Example 8 | 92 |
| Example 37 | Example 9 | 93 |
| Example 38 | Example 10 | 94 |
| Example 39 | Example 11 | 95 |
| Example 40 | Example 12 | 96 |
| Example 41 | Example 13 | 97 |
| Example 42 | Example 14 | 92 |
| Example 43 | Example 15 | 93 |

TABLE 2-continued

| Coin Cell | Separator | Capacity Retention After 100th Cycle |
|---|---|---|
| Example 44 | Example 16 | 92 |
| Example 45 | Example 17 | 90 |
| Example 46 | Example 18 | 90 |
| Example 47 | Example 19 | 92 |
| Example 48 | Example 20 | 91 |
| Example 49 | Example 21 | 93 |
| Example 50 | Example 22 | 93 |
| Example 51 | Example 23 | 93 |
| Example 52 | Example 24 | 91 |
| Example 53 | Example 25 | 91 |
| Example 54 | Example 26 | 91 |
| Example 55 | Example 27 | 92 |
| Example 56 | Example 28 | 91 |
| Comparative Example 5 | Comparative Example 1 | 80 |
| Comparative Example 6 | Comparative Example 2 | 85 |
| Comparative Example 7 | Comparative Example 3 | 90 |
| Comparative Example 8 | Comparative Example 4 | 70 |

Referring to Table 2, the cycling characteristics of a rechargeable lithium ion battery cell according to the present example embodiment were improved. When a non-water-soluble resin was added as a binder, the cycling characteristics of the cell were further improved.

Although the separator of Comparative Example 1 showed a satisfactory peel strength and shrinkage ratio, a rechargeable battery cell using the separator of Comparative Example 1 showed low (e.g., unfavorable) cycling characteristics. Without being bound to any particular mechanism or theory, it is believed that this may be attributable at least in part to the fact that the separator of Comparative Example 1 had high air permeability, but contained moisture.

Accordingly, cell cycling characteristics were not improved even though an acrylic resin obtained by polymerizing a carboxyl group-containing acrylic monomer (for example, sodium poly acrylate of Comparative Example 1) was used as a binder.

It may be necessary to include an acrylic acid derivative monomer as well as a carboxyl group-containing acrylic monomer to synthesize a binder capable of improving cell cycling characteristics.

Hereinbefore, a binder according to an embodiment of the present disclosure exhibited high heat resistance, strong adherence, and improved cell cycling characteristics.

The cycling characteristics of the rechargeable lithium ion battery 10 may be improved by using the binder according to the embodiment of the present disclosure to manufacture the separator 40, and using the separator 40 to manufacture the rechargeable lithium ion battery 10

The separator 40 is protected against thermal shrinkage, the risk of thermal runaway in rechargeable lithium ion battery 10 is suppressed, and thus, the safety of the rechargeable lithium ion battery 10 is improved.

As used herein, expressions such as "at least one of", "one of", and "at least one selected from", when preceding a list of elements, modify the entire list of elements and do not modify the individual elements of the list. Further, the use of "may" when describing embodiments of the present disclosure refers to "one or more embodiments of the present disclosure".

In addition, as used herein, the terms "use", "using", and "used" may be considered synonymous with the terms "utilize", "utilizing", and "utilized", respectively.

As used herein, the terms "substantially", "about", and similar terms are used as terms of approximation and not as terms of degree, and are intended to account for the inherent deviations in measured or calculated values that would be recognized by those of ordinary skill in the art.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While this disclosure has been described in connection with what is presently considered to be practical example embodiments, it is to be understood that the invention is not limited to the disclosed embodiments, but on the contrary, is intended to cover various modifications and equivalent arrangements included within the spirit and scope of the appended claims and equivalents thereof.

For example, the binder according to one embodiment of the present disclosure is used for a rechargeable lithium ion battery in the Examples, but may be used for other kinds of rechargeable batteries.

DESCRIPTION OF SOME OF THE SYMBOLS 10 rechargeable lithium ion battery
20 positive electrode
21 positive current collector
22 positive active material layer
30 negative electrode
31 negative current collector
32 negative active material layer
40 separator
40a substrate
40b coating layer

What is claimed is:

1. A separator for a rechargeable battery, comprising:
   a substrate and a coating layer on at least one surface of the substrate,
   wherein:
   the coating layer comprises a binder including an acrylic resin,
   the binder including the acrylic resin is a copolymerization acrylic resin in which a carboxyl group-containing acrylic monomer and an acrylic acid derivative monomer are copolymerized,
   the carboxyl group-containing acrylic monomer comprises an alkali metal salt or an ammonium salt,
   the acrylic resin comprises the alkali metal salt or the ammonium salt,
   the acrylic acid derivative monomer is at least one selected from acrylonitrile, methacrylonitrile, 2-cyanoethylacrylate, 2-cyanoethylmethacrylate, isobornyl acrylate, 2,2,2-trifluoroethylacrylate, methyl (meth)acrylate, butyl (meth)acrylate, ethyl (meth)acrylate, 2-ethylhexyl(meth)acrylic acid, hydroxyethyl acrylate, 1H,1H-pentafluoropropyl acrylate, 2,2,3,3-tetrafluoropropyl acrylate, polyadamantyl acrylate, and acrylamide, and
   the carboxyl group-containing acrylic monomer and the acrylic acid derivative monomer are present in a mole ratio of about 20:80 to about 80:20.

2. The separator of claim 1, wherein the carboxyl group-containing acrylic monomer comprises at least one selected from acrylic acid, methacrylic acid, maleic acid, mono methyl maleic acid, 2-carboxylethyl acrylate, and 2-carboxylethyl methacrylate.

3. The separator of claim 1, wherein the coating layer further comprises a non-water-soluble resin.

4. The separator of claim 3, wherein the non-water-soluble resin comprises polyvinylidene fluoride, a non-water-soluble acrylic resin, or a combination thereof.

5. The separator of claim 1, wherein the coating layer further comprises polyvinyl alcohol.

6. The separator of claim 1, wherein the coating layer further comprises inorganic particles.

7. The separator of claim 6, wherein the inorganic particles comprise alumina, boehmite, or a combination thereof.

8. A rechargeable battery comprising the separator of claim 1.

9. The rechargeable battery of claim 8, wherein the carboxyl group-containing acrylic monomer comprises at least one selected from acrylic acid, methacrylic acid, maleic acid, mono methyl maleic acid, 2-carboxylethyl acrylate, and 2-carboxylethyl methacrylate.

10. The rechargeable battery of claim 8, wherein the coating layer further comprises a non-water-soluble resin.

11. The rechargeable battery of claim 10, wherein the non-water-soluble resin comprises polyvinylidene fluoride, a non-water-soluble acrylic resin, or a combination thereof.

12. The rechargeable battery of claim 8, wherein the coating layer further comprises polyvinyl alcohol.

13. The rechargeable battery of claim 8, wherein the coating layer further comprises inorganic particles.

14. The rechargeable battery of claim 13, wherein the inorganic particles comprise alumina, boehmite, or a combination thereof.

* * * * *